US009764901B2

(12) United States Patent
Bogle et al.

(10) Patent No.: US 9,764,901 B2
(45) Date of Patent: Sep. 19, 2017

(54) MAGNETIC CONVEYOR BELT MODULE

(71) Applicant: Laitram, L.L.C., Harahan, LA (US)

(72) Inventors: David W. Bogle, Round Rock, TX (US); Richard A. Keb, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/916,069

(22) PCT Filed: Sep. 29, 2014

(86) PCT No.: PCT/US2014/058042
§ 371 (c)(1),
(2) Date: Mar. 2, 2016

(87) PCT Pub. No.: WO2015/048642
PCT Pub. Date: Apr. 2, 2015

(65) Prior Publication Data
US 2016/0221758 A1    Aug. 4, 2016

Related U.S. Application Data

(60) Provisional application No. 61/884,569, filed on Sep. 30, 2013.

(51) Int. Cl.
*B65G 17/46* (2006.01)
*B65G 17/00* (2006.01)
*B65G 17/40* (2006.01)

(52) U.S. Cl.
CPC ............. *B65G 17/46* (2013.01); *B65G 17/40* (2013.01); *B65G 2201/02* (2013.01)

(58) Field of Classification Search
None
See application file for complete search history.

(56) References Cited

U.S. PATENT DOCUMENTS

| 4,197,934 A | 4/1980 | Matsui et al. |
| 4,586,601 A | 5/1986 | Hodlewsky |
| 4,832,183 A | 5/1989 | Lapeyre |
| 4,836,360 A | 6/1989 | Kasik |

(Continued)

FOREIGN PATENT DOCUMENTS

| DE | 9401576.7 B2 | 8/1994 |
| EP | 2433883 B1 | 10/2012 |

(Continued)

OTHER PUBLICATIONS

International Search Report and Written Opinion of the International Searching Authority, PCT/US2014/058042, dated Dec. 23, 2014, Korean Intellectual Property Office, Daejeon Metropolitan City, Republic of Korea.

(Continued)

*Primary Examiner* — Kavel Singh
(74) *Attorney, Agent, or Firm* — Catherine M. Bishop

(57) ABSTRACT

A magnetic conveyor belt module integrates a magnetic element into the body of the module to attract conveyed articles to the body. The magnetic conveyor belt module includes a recess for seating a magnetic element and a retention element for retaining the magnetic element within the recess. A cover encapsulates the magnetic element within the body of the module.

18 Claims, 7 Drawing Sheets

(56) References Cited

U.S. PATENT DOCUMENTS

| | | | |
|---|---|---|---|
| 5,335,768 A * | 8/1994 | Schladweiler | B65G 17/08 |
| | | | 198/853 |
| 5,904,241 A | 5/1999 | Verdigets et al. | |
| 6,297,451 B1 * | 10/2001 | Ernst | B65G 47/268 |
| | | | 174/66 |
| 7,556,136 B2 * | 7/2009 | Marshall | B65G 47/71 |
| | | | 198/370.09 |
| 7,597,188 B2 | 10/2009 | Volpi | |
| 8,434,613 B2 | 5/2013 | Ozaki | |
| 8,695,784 B2 * | 4/2014 | Ota | B65G 15/32 |
| | | | 198/459.6 |
| 8,881,890 B2 * | 11/2014 | MacLachlan | B65G 17/24 |
| | | | 198/779 |
| 2001/0052451 A1 | 12/2001 | Ruoss et al. | |
| 2005/0269189 A1 | 12/2005 | Rau et al. | |
| 2009/0095599 A1 | 4/2009 | Marshall et al. | |
| 2009/0308716 A1 | 12/2009 | Marsetti | |
| 2010/0230245 A1 | 9/2010 | Ragan et al. | |
| 2014/0346014 A1 | 11/2014 | Andreoli et al. | |
| 2015/0183585 A1 | 7/2015 | Menke et al. | |

FOREIGN PATENT DOCUMENTS

| | | |
|---|---|---|
| FR | 2226337 A1 | 11/1974 |
| JP | 06-329224 A | 11/1994 |
| JP | H1017125 A | 1/1998 |
| JP | 2012041144 A | 3/2012 |
| JP | 2012041145 A | 3/2012 |
| KR | 10-0463447 B1 | 12/2004 |
| KR | 10-1103427 B1 | 1/2012 |
| WO | 2008125385 A1 | 10/2008 |
| WO | 2012165769 A2 | 12/2012 |
| WO | 2015048642 A1 | 4/2015 |

OTHER PUBLICATIONS

Extended European Search Report, European Patent Application No. 14848396.9, dated Mar. 7, 2017, European Patent Office, Munich, Germany.

International Search Report and Written Opinion of the International Searching Authority, PCT/US2017/015970, dated May 12, 2017, Korean Intellectual Property Office, Republic of Korea.

First Office Action of the State Intellectual Property Office of China, 201480053982.9, dated Mar. 1, 2017.

\* cited by examiner

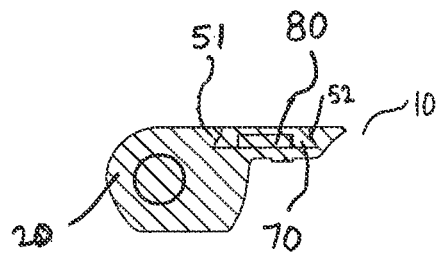
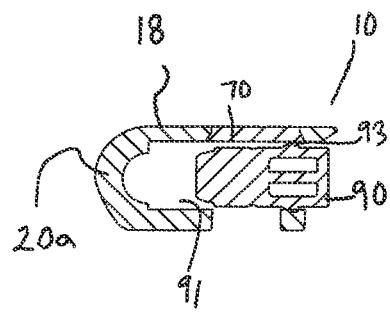
FIG. 3    FIG. 4
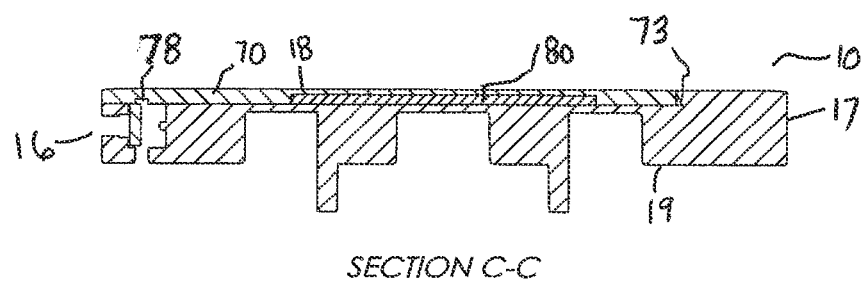
SECTION C-C
FIG. 5
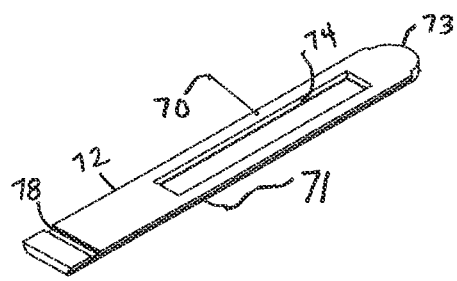
FIG. 6

SECTION B-B

SECTION A-A

SECTION A-A

SECTION B-B

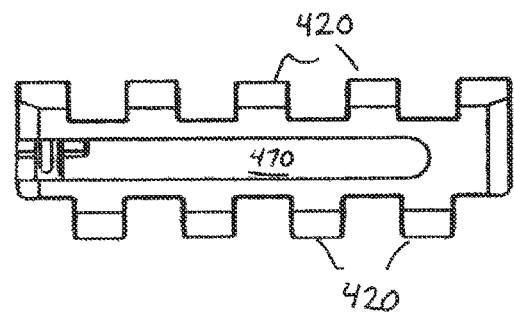
FIG. 20
FIG. 21
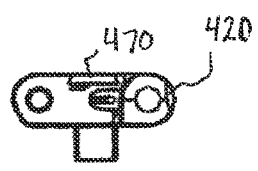
FIG. 22
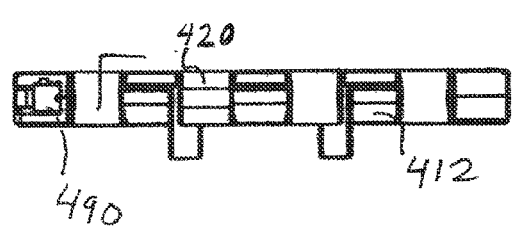
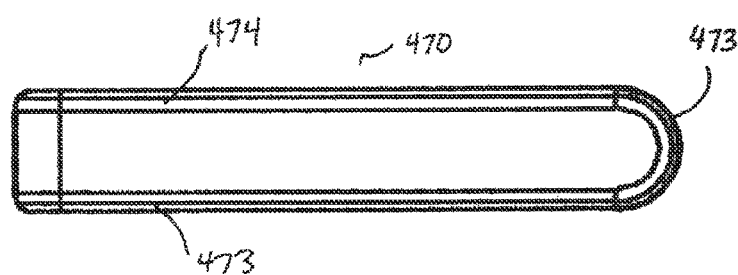
FIG. 23
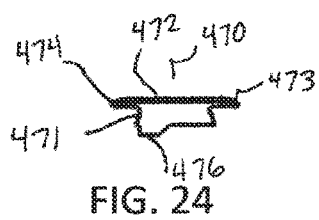
FIG. 24
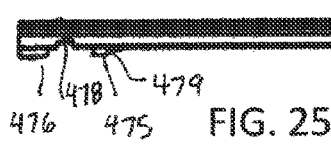
FIG. 25
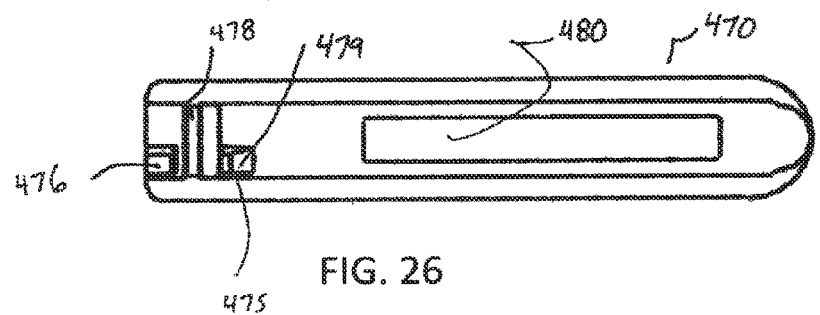
FIG. 26

US 9,764,901 B2

MAGNETIC CONVEYOR BELT MODULE

BACKGROUND OF THE INVENTION

The invention relates generally to power-driven conveyors and more particularly to modular plastic conveyor belts with metal-attracting or ferro-magnetic properties.

Conveyors are often used to transport items. To convey metal or magnetically attractable items, such as bakery pans, conveyors have been used that include magnetic elements to retain the magnetically-attractive items on the conveyor. Integrating the magnetic elements into the conveyor may be cumbersome.

Modular plastic conveyor belts are widely used in various industries to convey products. Modular plastic conveyor belts are constructed of a series of rows of side-by-side belt modules. Hinge eyes along opposite ends of each row interleave with hinge eyes of consecutive rows. A hinge rod inserted in the interleaved hinge eyes connects the rows together at hinge joints into an endless conveyor belt loop.

SUMMARY OF THE INVENTION

A magnetic conveyor belt module comprises a main body, a magnetic element and a carrier for a magnetic element coupled to the main body. The module allows a magnetic element to be easily and removably integrated with the module. A magnetic element is seated in a recess near the top surface of the module body. A cover covers the magnetic element. A retention element retains the cover and magnetic element in place.

According to one aspect, a conveyor belt module comprises a module body, a first set of hinge elements spaced apart across gaps along the first end of the module body, a second set of hinge elements spaced apart across gaps along the second end of the module body, a slot formed in the upper surface of the module body and extending from a first edge towards a second edge of the module body. The module also includes an insert containing a magnetic element inserted into the slot.

According to another aspect, a conveyor belt module comprises a module body, first and second sets of hinge elements, a magnetic element coupled to the module body and a retaining element for retaining the magnetic element in a general position relative to the module body.

According to another aspect, a magnetic conveyor belt module comprises a module body, first and second sets of hinge elements, a recess in a top surface of the module body, a magnetic bar seated in the recess and a cover covering the recess and encapsulating the magnetic bar. The cover has a top surface that is substantially flush with the top surface of the module body.

BRIEF DESCRIPTION OF THE DRAWINGS

These features and aspects of the invention, as well as its advantages, are better understood by referring to the following description, appended claims, and accompanying drawings, in which:

FIG. 3 is a cross-sectional view of the magnetic conveyor belt module through lines A-A of FIG. 2;

FIG. 4 is a cross-sectional view of the magnetic conveyor belt module through lines B-B of FIG. 2;

FIG. 5 is a cross-sectional view of the magnetic conveyor belt module through lines C-C of FIG. 2;

FIG. 6 is a bottom view of the magnet-carrying insert of the magnetic conveyor belt module;

FIG. 20 is a top view of the assembled magnetic conveyor belt module of FIG. 19;

FIG. 21 is an edge view of the assembled magnetic conveyor belt module of FIG. 19;

FIG. 22 is a side view of the assembled magnetic conveyor belt of FIG. 19;

FIG. 23 is a top view of the magnet-carrying insert of the magnetic conveyor belt module of FIG. 19;

FIG. 24 is an end view of the magnet-carrying insert of the magnetic conveyor belt module of FIG. 19;

FIG. 25 is a side view of the magnet-carrying insert of the magnetic conveyor belt module of FIG. 19; and FIG. 26 is a bottom view of the magnet-carrying insert of the magnetic conveyor belt module of FIG. 19.

DETAILED DESCRIPTION OF THE INVENTION

Figure 1:
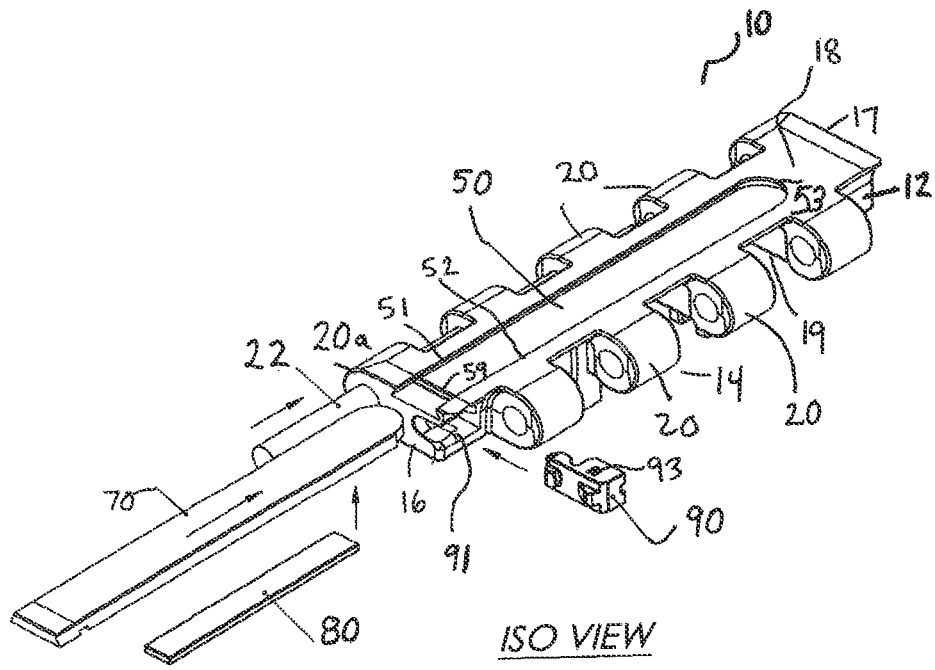
FIG. 1 is an exploded view of a magnetic conveyor belt module according to an illustrative embodiment of the invention.
Figure 2:
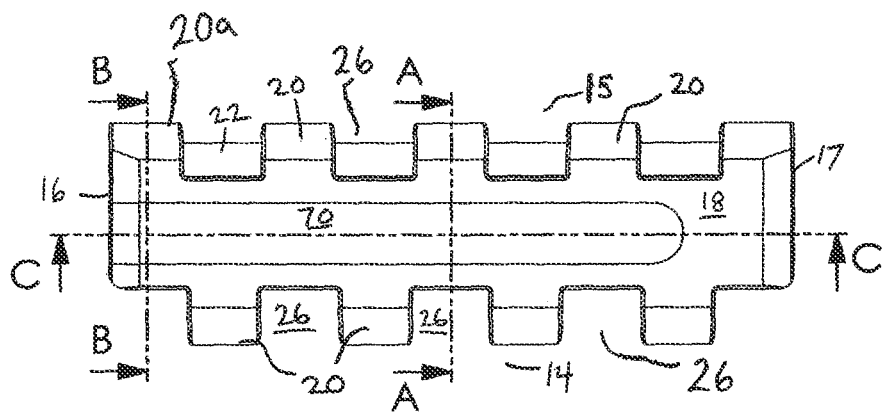
FIG. 2 is a top view of the magnetic conveyor belt module of FIG. 1 when assembled.
Figure 7:
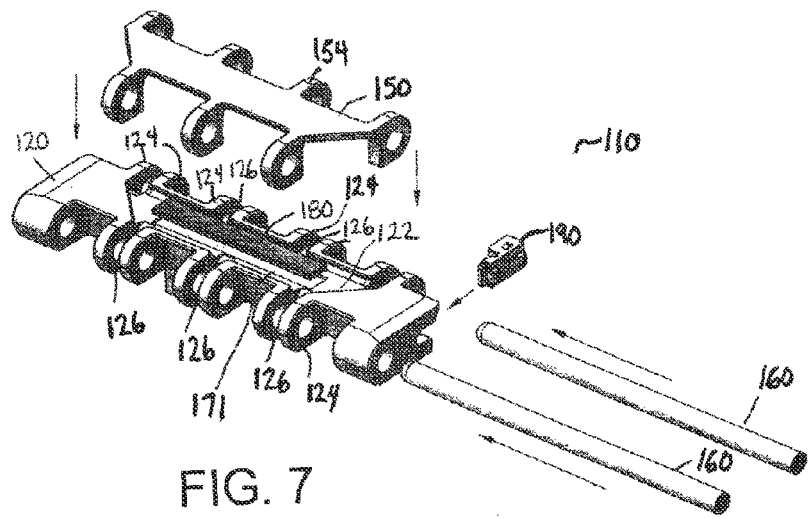
FIG. 7 is an exploded view of another embodiment of a magnetic conveyor belt module.
Figure 8:
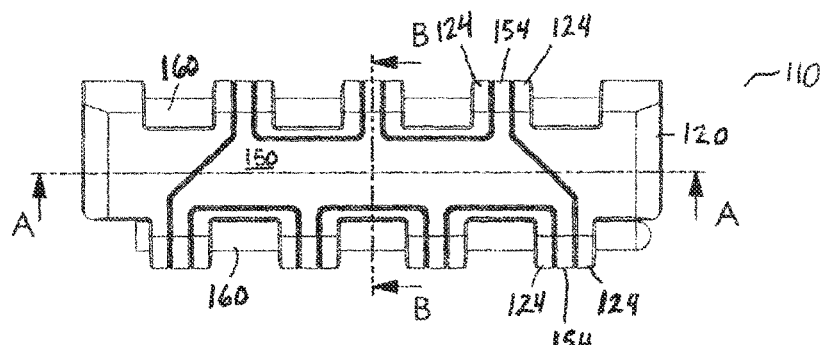
FIG. 8 is a top view of the magnetic conveyor belt module of FIG. 7.
Figure 10:
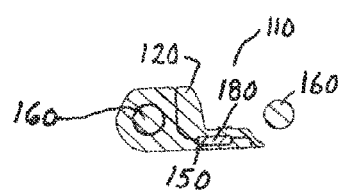
FIG. 10 is a cross-sectional view of the magnetic conveyor belt module of FIG. 8 through lines B-B.

A conveyor belt module integrates a magnetic element to attract conveyed articles against the conveying surface of the module. The invention will be described below relative to certain illustrative embodiments, though those skilled in the art will recognize that the invention is not limited to the described embodiments.

Referring to FIGS. 1-6, a conveyor belt module 10 for a conveyor belt includes a module body 12 that extends longitudinally from a first end 14 to a second end 15. The longitudinal direction is the direction of belt travel when such a module is built into a modular conveyor belt. The module body extends laterally from a first edge 16 to a second edge 17. In thickness, the module body extends from an upper surface 18, which forms the conveying surface on which conveyed articles are carried, to an opposite surface 19. Hinge structure, shown as eyes 20, extends longitudinally outward from the first and second ends of the module body. The tops of the hinge eyes form a continuation of the conveying surface. The hinge eyes on one end of the module body are laterally offset from the hinge eyes at the other end. Gaps 26 between laterally consecutive hinge eyes are sized to receive the hinge eyes of similar modules in an adjacent row of modules in a conveyor belt.

The modules are preferably made of thermoplastic polymers, such as polypropylene, polyethylene, acetal, or composite polymers in an injection-molding process. Plastic conveyor belt modules made in this way are available commercially from Intralox, L.L.C., of Harahan, La., USA. In another embodiment, the modules are formed of stainless steel or another suitable material.

A number of modules 10 are used to form a conveyor belt. The belt may comprise a series of rows of edge-to-edge belt modules. Modules of different lateral widths are used to construct the belt in a bricklay pattern. But wide modules extending the entire width of the belt could alternatively be used. The belt may comprise a combination of magnetic and non-magnetic modules. The rows are interconnected by hinge rods 22 extending laterally through the passageways formed by the aligned openings in the interleaved hinge eyes between adjacent rows. The belt conveys articles atop the conveying surfaces 18 of the modules along an upper carryway portion of the conveyor. The belt is trained around sprockets mounted on each end of the carryway, and returns along a returnway below the carryway.

The magnetic module 10 includes a recess, illustrated as a slot 50, in the upper surface 10 for receiving a magnetic insert. The illustrative slot 50 extends from the first edge 16 to an intermediate location within the body, and is open to the side of the module. The illustrative slot 50 slidably receives a magnetic insert 70 housing a magnet 80. In another embodiment, the recess has another shape other than a slot.

The slot has chamfered sides 51, 52 that angle inwards and a rounded end 53. The insert 70 has a rounded tip 73 complementary to the rounded end 53 and chamfered or tapering sides 71, 72 to form a substantially trapezoidal cross-section. The insert 70 includes a recess 74 or pocket for receiving a magnetic element, illustrated as a rectangular magnetic bar 80, though the invention is not so limited. When assembled, the upper surface of the insert 70 is flush with the upper surface of the module body 12 to form a substantially continuous surface. The insert 70 covers and encapsulates the magnetic bar 80.

The module further includes a retention element for retaining the magnetic insert 70 within the module body. According to an illustrative embodiment of the invention, the insert interacts with a hinge rod retaining element 90 to retain the insert within the module body.

The illustrative rod retaining element 90 comprises a movable shuttle plug, such as the shuttle plugs describe in U.S. Pat. No. 5,904,241 and U.S. Pat. No. 6,814,223, which are incorporated herein by references, or the retaining elements U.S. Pat. No. 6,857,516 and U.S. Pat. No. 7,255,227, the contents of which are incorporated herein by reference.

The illustrative shuttle plug 90 is inserted in a passageway 91 in the module body and into an edge hinge element 20*a* for retaining a rod 22 within a hinge passageway. The shuttle plug includes a detent 93 that extends through an opening, shown as a channel 59, in the floor of the module body slot 50. The detent engages a recess, shown as a channel 78, in the insert 70 to retain the insert within the module body. The opening 59 and recess 78 allow the shuttle plug 90 to slide within the passageway 91 while still engaging the recess of the insert 70.

The magnetic bar 80 is preferably centered on the module body, as shown in FIG. 5.

The use of a slot, insert and automatic locking mechanism facilitates integration of an article-attracting element, such as a magnet, into the conveyor belt module.

Figure 9:
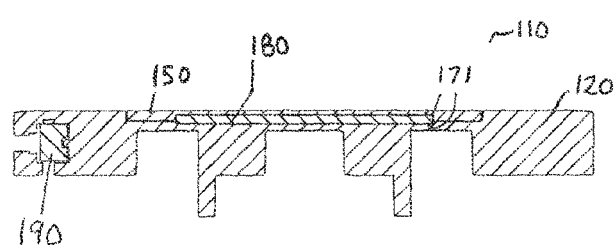
FIG. 9 is a cross-sectional view of the magnetic conveyor belt module of FIG. 8 through lines A-A.

In another embodiment, shown in FIG. 7-10, a magnetic element is sandwiched between elements in the module. The module 110 comprises a base member 120, a top cover 150 and a magnet 180 or magnetic element sandwiched between the top cover and base member. The base member has a recess 122 for receiving the top cover 150. When received in the recess 122, the top cover upper surface is flush with the upper surface of the base member 120, as shown in FIG. 9, and encapsulates the magnet 180. The module includes openings 126 within the hinge elements 124 for receiving hinge elements 154 on the top cover 150. The base hinge elements 124 sandwich the top cover hinge elements 154. One or more hinge rods 160 form a retention element for retaining the top cover on the base member. The base member and/or the top cover may include a pocket 171 for accommodating the magnet 180. The pocket 171 is sized and shaped to seat the magnet 180. The illustrative module further includes a shuttle plug 190 for retaining the hinge rods within the hinge rod passageway.

Figure 11:
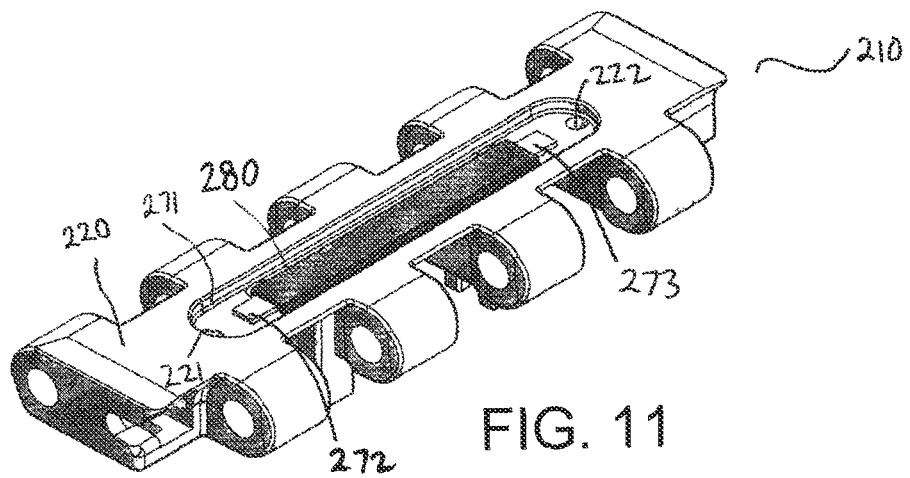
FIG. 11 is an isometric view of a magnetic conveyor belt module during formation according to another embodiment of the invention.
Figure 12:
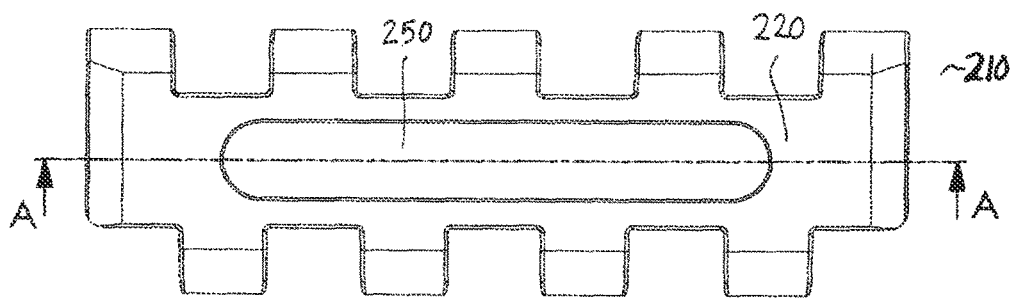
FIG. 12 is a top view of the magnetic conveyor belt module of FIG. 11 after overmolding of a cover for the magnetic element.
Figure 13:
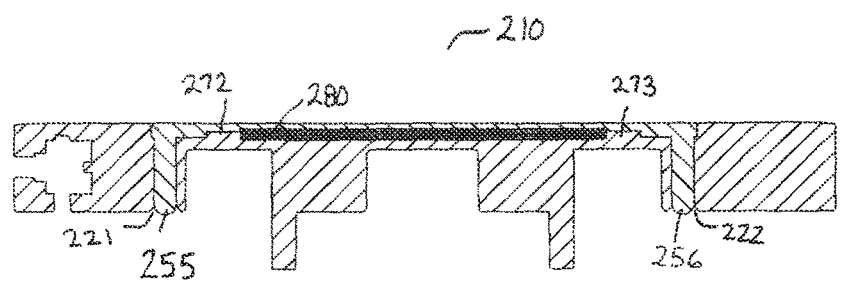
FIG. 13 is a cross-sectional view through lines A-A in FIG. 12.
Figure 14:
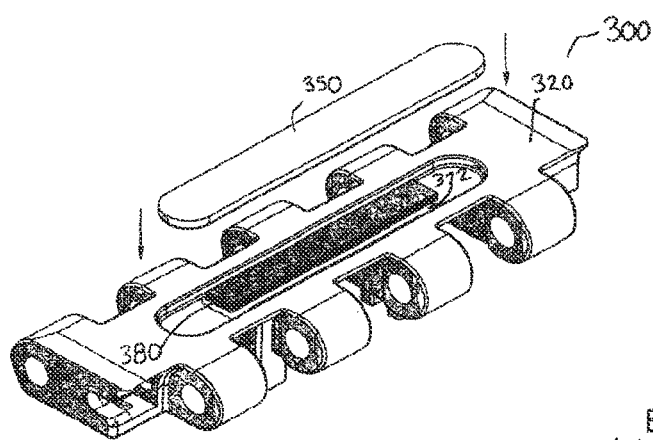
FIG. 14 is an exploded, isometric view of a magnetic conveyor module according to another embodiment of the invention.
Figure 15:
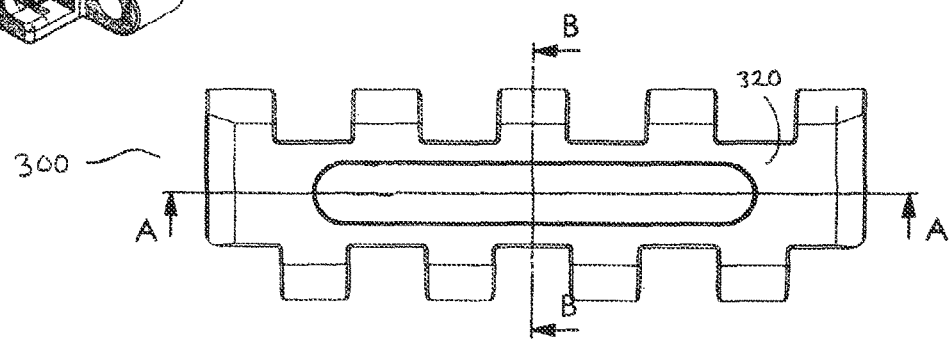
FIG. 15 is a top view of the module of FIG. 14.
Figure 16:
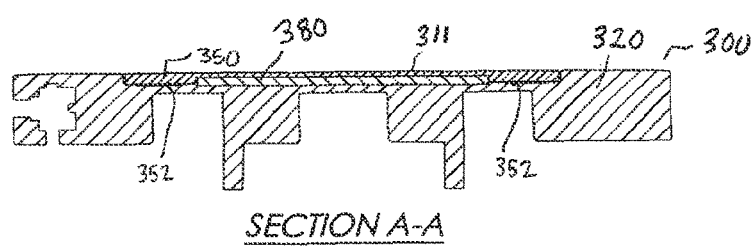
FIG. 16 is a cross-sectional view of the magnetic conveyor belt module of FIG. 14 through lines A-A.
Figure 17:
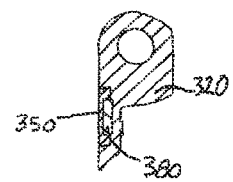
FIG. 17 is a cross-sectional view of the magnetic conveyor belt module of FIG. 14 through lines B-B.

FIGS. 11-13 show another embodiment of a magnetic conveyor belt module 210. The conveyor belt module 210 integrates a magnetic element 280 into the module during a secondary molding process. A base member 220, formed during an initial mold includes a recess or pocket 271 for receiving a magnetic element 280. The recess or pocket 271 includes guide pads 272, 273 for positioning the magnetic element 280. After positioning the magnetic element 280 in the recess or pocket 271, a cover 250 is overmolded onto the module to encapsulate the magnetic element 280. The base member 220 includes two passageways 221, 222 extending down from the recess 271 for creating solid protrusions 255, 256 anchoring the overmolded cover 250 to the base member 220. The overmolded cover 250 preferably has a top surface that is flush with the top surface of the base member 220, as shown in FIG. 13.

In one embodiment, the magnetic element 280 comprises a samarium cobalt magnet, allowing the magnet the ability to maintain the ability to attract after undergoing the high temp overmolding process.

Figure 18:
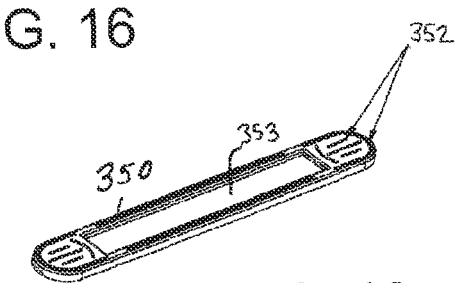
FIG. 18 is a bottom view of the cover of the magnetic conveyor belt module of FIG. 14.
Figure 19:
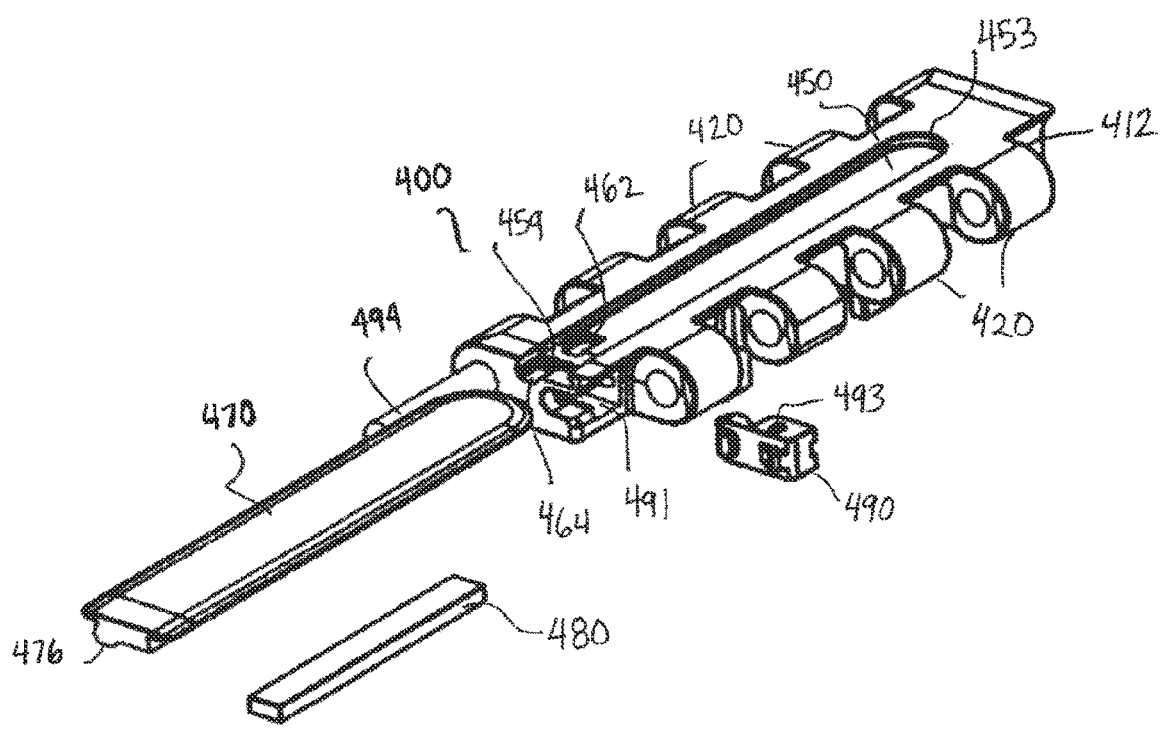
FIG. 19 is an exploded view of a magnetic conveyor belt module according to another embodiment of the invention.

In another embodiment of the invention, shown in FIGS. 14-18, a cover 350 for covering a magnetic element 380 may be ultrasonically welded to a base member 320 to form a magnetic conveyor belt module 300. The magnetic element 380 is positioned within a recess or pocket 371 in the upper surface of the base member 320. The recess or pocket 371 includes a deeper recess 372 configured to receive and position the magnetic element 380. The cover 350, as shown in FIG. 18, includes weld joints 352 for ultrasonically welding the cover to the base member 322 to encapsulate the magnetic element 380 within the body of the module. The cover also includes a recess 353 for receiving the top portion of the magnetic element 380. When assembled, the magnetic conveyor belt module integrates the magnetic element 380 into the body while providing a substantially continuous upper conveying surface 311.

FIGS. 19-26 show a magnetic conveyor belt module 400 according to another embodiment of the invention. The magnetic conveyor belt module includes a module body 412 having hinge elements 420 and a recess, shown as a slot 450, for receiving a magnetic insert 470 housing a magnet 480. The magnetic conveyor belt module 400 is similar to the embodiment shown in FIGS. 1-6, with the addition of an insert retainer that engages the rod retaining element 490 when the module is fully assembled. The illustrative insert retainer comprises first and second protrusions 475, 476 on the bottom surface of the insert 470 for engaging recesses 462, 464 in the module body.

The illustrative magnetic insert 470 includes a rounded tip that fits into a rounded end 453 of the slot 450.

The module includes a shuttle plug 490 inserted in a passageway 491 in the module body and into an edge hinge element for retaining a rod 494 within a hinge passageway. The shuttle plug includes a detent 493 that extends through an opening or abuts a side edge 459 in the floor of the module body slot 50. The detent engages a recess, shown as a channel 478, in the insert 470 to retain the insert within the module body. The opening 459 and channel 478 allow the shuttle plug 490 to slide within the passageway 491 while still engaging the recess of the insert 470. The channel 478 is between the first and second protrusions 475, 476 on the insert. When the front protrusion 479 is locked in the recess 462, the second protrusion fits in the rear recess 464 and locks the detent 493 of the shuttle plug within the passageway.

The illustrative first protrusion 475 on the insert includes a sloped front face 479 to facilitate insertion and locking of the insert 470.

As shown in FIG. 24, the insert 470 includes a base portion 471 and an overhanging upper portion 472. The base portion 471 includes sloping sides, though the invention is not so limited. The upper portion includes a flat top surface and tapering edges 473, 474.

In another embodiment a cover for retaining a magnet relative to a module body can be glued or otherwise attached to the module body.

Though the illustrative embodiments show the magnet as covered, the invention is not so limited. For example, the magnetic element can be partially or fully exposed. The magnetic element may be at or near the top surface of the module, or inset from the top surface.

The invention is also not limited to the illustrative magnetic bar. The magnetic element can have any suitable size, shape, position and orientation.

In another embodiment of the invention, the module comprises magnetizable material that is added during formation of the module using injection molding. The magnetizable material can be magnetized within the mold to incorporate a magnetic element into the conveyor belt module. In one embodiment, a cover may be molded from a magnetizable plastic, and then inserted into or overmolded onto a module body. The magnetizable plastic may then be magnetized to integrate a magnetic element to a conveyor belt module.

Although the invention has been described in detail with reference to a few exemplary versions, other versions are possible. The scope of the claims is not meant to be limited to the versions described in detail.

What is claimed is:

1. A conveyor belt module comprising:
    a module body extending longitudinally in the direction of belt travel from a first end to a second end, laterally from a first edge to a second edge and in thickness from a top surface to an opposite bottom surface;
    a first set of hinge elements spaced apart across first gaps along the first end;
    a second set of hinge elements spaced apart across second gaps along the second end;
    a slot formed in and open to the upper surface and extending from the first edge towards the second edge, wherein the slot is open to the first edge and includes an opening to a passageway in the module body below the slot;
    an insert inserted into the slot, the insert including a magnetic element and a channel on a bottom surface of the insert; and
    a rod retention element inserted in the passageway for retaining a hinge rod, wherein the rod retention element includes a detent passing through the opening that engages the channel on the bottom surface of the insert to retain the insert in the slot.

2. The module of claim 1, wherein the slot includes chamfered edges.

3. The module of claim 1, wherein the insert includes chamfered edges.

4. The module of claim 1, wherein the slot and insert have a rounded tip.

5. The module of claim 1, wherein the magnetic element comprises a magnetic bar inserted in a recess of the insert.

6. The module of claim 1, wherein the module and insert are formed of plastic.

7. The module of claim 1, wherein the insert includes a ramped protrusion on a bottom surface for insertion in a recess on the module body.

8. The module of claim 7, wherein the insert further includes a second protrusion on the bottom surface adjacent to an end of the insert and the channel.

9. A conveyor belt module comprising:
    a module body extending longitudinally in the direction of belt travel from a first end to a second end, laterally from a first edge to a second edge and in thickness from a top surface to an opposite bottom surface;
    a first set of hinge elements spaced apart across first gaps along the first end;
    a second set of hinge elements spaced apart across second gaps along the second end;
    an elongated insert including a magnetic element coupled to the module body, the elongated insert having a channel formed on a bottom surface thereof; and
    a retaining element comprising a shuttle plug inserted in a passageway of the module body and in communication with one of the hinge elements, the retaining element including a detent that cooperates with the channel on the elongated insert to retain the magnetic element in a general position relative to the module body.

10. The conveyor belt module of claim 9, wherein the magnetic element is sandwiched between the module body and a top cover coupled to the module body.

11. A magnetic conveyor belt module, comprising:
    a module body extending longitudinally in the direction of belt travel from a first end to a second end, laterally from a first edge to a second edge and in thickness from a top surface to an opposite bottom surface;
    a first set of hinge elements spaced apart across first gaps along the first end;
    a second set of hinge elements spaced apart across second gaps along the second end;
    a slot formed in the top surface of the module body and open to the first edge of the module body, the slot including a first recess and a second recess in a bottom surface thereof;
    a magnetic bar seated in the slot; and a cover covering the slot and encapsulating the magnetic bar, wherein the cover has a first protrusion that mates with the first recess and a second protrusion that mates with the second recess.

12. The magnetic conveyor belt module of claim 11, wherein the slot extends from the first edge towards the second edge.

13. The magnetic conveyor belt module of claim 11, wherein the cover is ultrasonically welded to the module body.

14. The magnetic conveyor belt module of claim 11, wherein the slot includes guide pads for positioning the magnetic bar.

15. The magnetic conveyor belt module of claim 11, wherein the first protrusion has a sloped front face.

16. The magnetic conveyor belt module of claim 11, wherein the slot has an opening between the first recess and the second recess that is open to a passageway in the module body.

17. The magnetic conveyor belt module of claim 16, wherein the cover further includes a channel between the first protrusion and the second protrusion.

18. The magnetic conveyor belt module of claim 17, further comprising a shuttle plug inserted in the passageway and having a detent configured to engage the channel in the cover.

* * * * *